United States Patent
Myllymaki et al.

(10) Patent No.: US 7,259,694 B2
(45) Date of Patent: Aug. 21, 2007

(54) WIRELESS COMMUNICATION SYSTEM AND METHOD TO PROVIDE GEO-SPATIAL RELATED EVENT DATA

(75) Inventors: Jussi Petri Myllymaki, San Jose, CA (US); Kevin Trung Cao, Hamburg (DE); Daniel Alexander Ford, Los Gatos, CA (US); Reiner Kraft, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 09/791,595

(22) Filed: Feb. 26, 2001

(65) Prior Publication Data

US 2002/0118118 A1    Aug. 29, 2002

(51) Int. Cl.
G08G 1/123    (2006.01)
(52) U.S. Cl. ............. 340/993; 340/539.13; 340/539.16
(58) Field of Classification Search ........... 340/286.02, 340/280.13, 539.13, 517, 690, 531, 993, 340/539.16, 540, 501, 573.6, 572, 991; 702/1, 702/2, 3; 342/357.1, 357.06, 357.13, 457, 342/463; 455/456
See application file for complete search history.

(56) References Cited

U.S. PATENT DOCUMENTS

| | | | | |
|---|---|---|---|---|
| 5,036,334 A | * | 7/1991 | Henderson et al. | ......... 342/460 |
| 5,075,857 A | * | 12/1991 | Maresca | ....................... 702/15 |
| 6,018,699 A | * | 1/2000 | Baron, Sr. et al. | ............... 702/3 |
| 6,023,223 A | * | 2/2000 | Baxter, Jr. | .................. 340/531 |
| 6,199,045 B1 | * | 3/2001 | Ginger et al. | ................ 340/990 |
| 6,240,369 B1 | * | 5/2001 | Foust | ............................ 702/3 |
| 6,297,766 B1 | * | 10/2001 | Koeller | .................. 342/357.06 |
| 6,414,635 B1 | * | 7/2002 | Stewart et al. | .............. 342/457 |
| 6,484,033 B2 | * | 11/2002 | Murray | ....................... 455/456 |

FOREIGN PATENT DOCUMENTS

| | | |
|---|---|---|
| JP | 9-054895 | 2/1997 |
| JP | 11-136365 | 5/1999 |
| JP | 2000-293423 | 10/2000 |
| JP | 2001-016158 | 1/2001 |
| SE | PCT/SE00/00306 | 2/2000 |
| US | PCT/US00/13858 | 5/2000 |

OTHER PUBLICATIONS

"International Search Report" PCT/EP 02/02893, Feb. 25, 2002, 4 pages.
"Mobile Information Service Based on Multi-Agent Architecture", IEICE Trans. Commun., vol. E80-B, No. 10, Oct. 1997, Nobutsugu Fujino, Takashi Kimoto, Ichiro Iida, pp. 1401-1406.
"Method for Generating Location-Specific Internet Application Content", Disclosed by Ericsson Inc., 1 page, Sep. 1999.

* cited by examiner

*Primary Examiner*—Van T. Trieu
(74) *Attorney, Agent, or Firm*—Gibb & Rahman, LLC; Leonard T. Guzman, Esq.

(57) ABSTRACT

A system and method for communication of information that has particular significance to a specific location only to those individuals that are at or near that geo-spatial location. In particular, providing safety factor data and alerts is a preferred use of the invention. The invention allows information to be tailored to the individual at that location by selectively filtering what is communicated and what is not. The system includes a transmitting proximity event server, a GPS client wireless component that can be a personal wireless communication device (such as Palm Pilot, cellular digital phones, etc.) or personal computer configured for use within a global position satellite network.

30 Claims, 6 Drawing Sheets

WIRELESS COMMUNICATION SYSTEM AND METHOD TO PROVIDE GEO-SPATIAL RELATED EVENT DATA

BACKGROUND OF THE INVENTION

1. Field of the Invention

This invention generally relates to wireless communication components and more particularly to global positioning satellite (GPS) technology/wireless communication integration of such components, and notifies a person or object that they are at or near the geo-spatial location of a significant event of subscribed data by the person or object.

2. Description of the Related Art

Rapid advances are being made in the field of wireless communication. An increasing number of applications are being developed for the wireless device platform, ranging from smart cellular phones to two-way text pagers. By the year 2001, new cellular phones are required to have a location-tracking device based on the global position satellite (GPS) network. This gives rise to systems that deliver real-time, location-based information and services to wireless subscribers. Typically, a wireless application retrieves data from a server to the wireless handset when the user invokes a specific function in the handset. For instance, a user might request flight departure time information from the server of an airline. In many cases, however, it is desirable to deliver ("push") information to the user on a continuous basis. Personal safety is one important aspect where push technology is required. To illustrate, U.S. Pat. No. 6,144,336, discloses a positional, time-stamped based wireless communication GPS/wireless component network having "911" emergency number capability.

However, such systems do not provide complex geo-spatial related data (information) to a user while using wireless-based components to make informed decisions where an awareness of location-based event information is necessary. Examples of such location-based event information include crime reports; traffic safety reports; and environmental hazard reports.

Thus, there is need for the ability to concurrently monitor several geo-spatial related data (information) sources, for example, earthquake reports, accident reports, and safety-related news in the user's vicinity. This data can then be used for alerting them accordingly to take appropriate action. Further, there is need to provide data of future and past events dependent upon a current geo-spatial location. The present invention solves these problems by providing a real-time, location-based information system that continuously delivers information to the user's wireless handset, helping them maintain an awareness of events in their vicinity and assisting them in taking appropriate action.

SUMMARY OF THE INVENTION

It is, therefore, a primary object of the present invention to provide a system and method for communication of data (information) that has particular significance to a specific location only to those individuals that are at or near that location. A common use of the invention is to deliver location-based safety information to users. The invention allows information to be tailored to the individual at that location by selective filtering of what is communicated.

The system of the invention includes a transmitting proximity event server, a GPS client wireless component that can be a personal wireless Personal Digital Assistant (PDA) communication device (such as Palm Pilot, cellular digital phones, etc.) or a personal computer configured for use within a global positioning satellite network. In a preferred embodiment, the invention comprises a "personal safety advisor" system that continuously tracks location-based event information such as earthquake and accident reports and compares the current hazard level to the user's profile information. When the hazard level exceeds a threshold set by the user, the user is notified of the event and the information can be prominently displayed on the user's wireless handset. Various non-safety related applications of the invention include tourists who are near interesting attractions, or people who may be close to a book store where their favorite author is having a book signing.

It is another object of the invention to provide a method of activating geo-spatial dependent data using a server and a global positioning satellite-based wireless component, wherein the method comprises receiving input event data associated with a designated geo-spatial area at the server, maintaining and updating the event managed data and event subscribed data at the server, matching a profile that is subscribed to by a user when the user enters the designated geo-spatial area, and notifying the wireless component of the event data.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
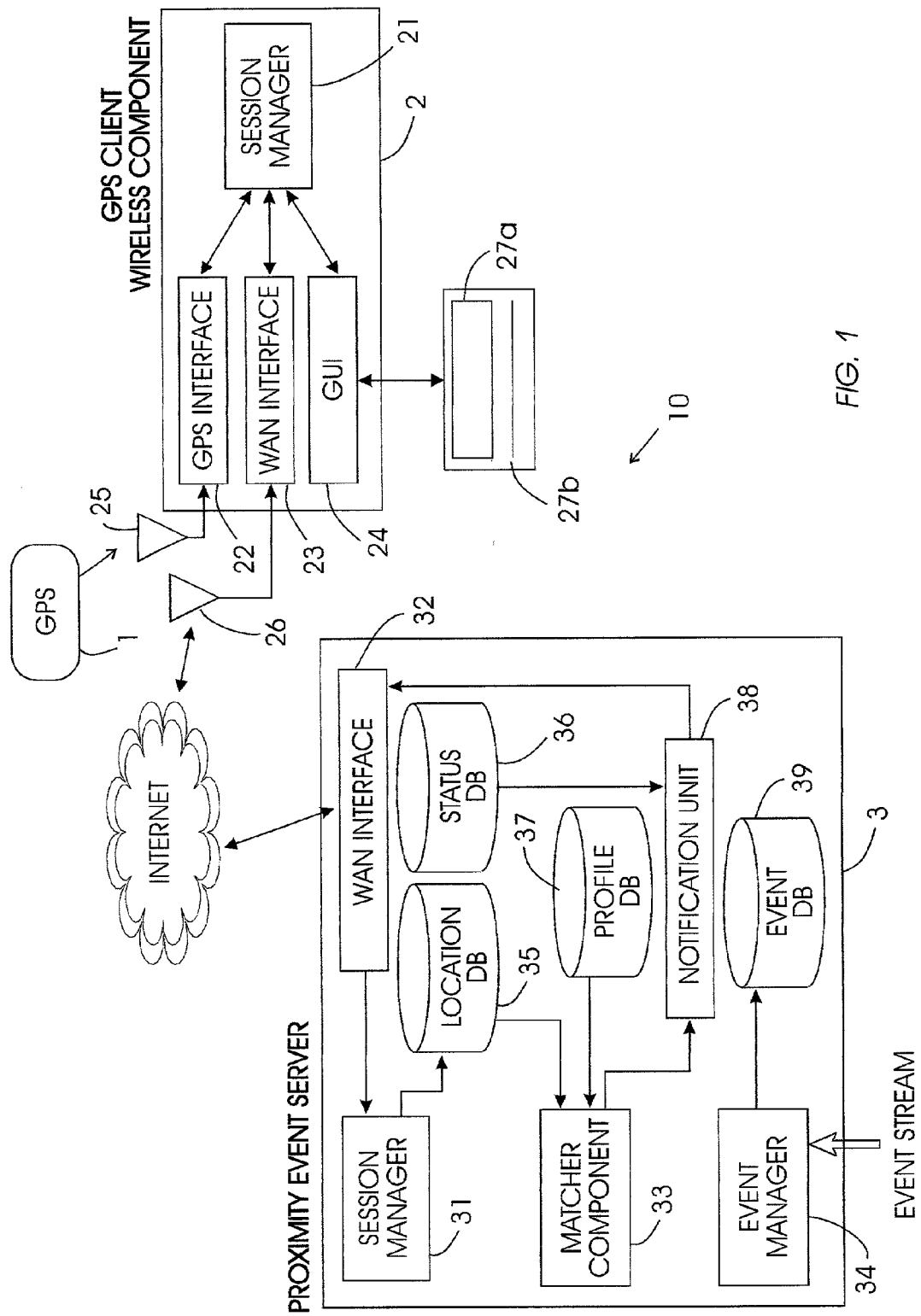
FIG. 1 is a schematic diagram of a hardware system adapted to implement the invention.

The purpose of this invention is to present a global positioning satellite-based wireless component user with a geo-spatial activated system and method. An exemplary implementation of system hardware of the invention is shown in FIG. 1. The event proximity activated system 10 includes two main components: a GPS client wireless component 2 and a proximity event server 3.

As illustrated in FIG. 1, a typical configuration of an information handling/wireless communication system in accordance with the invention has a central processing units in both the server 3 and the wireless component 2. Each of these central processing unit could include various mapping units, weighting units, classification units, clustering units, filters, adders, subtractors, comparators, etc. Alternatively, as would be known by one ordinarily skilled in the art given this disclosure, multiple specialized CPU's (or other similar individual functional units) could perform the same processing, mapping, weighting, classifying, clustering, filtering, adding, subtracting, comparing, etc. Moreover, although the stored databases as shown in FIG. 1 reside in the event server 3, specialized databases can be incorporated in the wireless component 2 wherein the user can access data locally.

An "event" is defined as always being associated with a geo-spatial location. GPS 1 is the existing GPS satellite network. Through an event channel, which receives events through an event producer subsystem through an "Event Stream" to an event manager 34 and event database 39; an event management and subscription subsystem comprising session manager 31, a location database 35, a user profile database 37, and a session manager 31 which enables a person to subscribe to a particular event; and a profile matching and notification subsystem including a notification unit 38 with a matcher 33, which receives periodic updates of a person's position, sends alerts or notifications to persons, based on subscribed events through a wide area network (WAN) interface 32 to a subscription based GPS client wireless component 2. A global positioning satellite GPS 1 transmits positional information to the wireless component 2 through antenna 25.

The GPS Client Wireless Component 2 (CWC) may be implemented on a laptop computer, cell phone, personal digital assistant (PDA) or integrated in a car system having a wireless wide area network (WAN) connection 23 for communicating with proximity event server 3. CWC includes a GPS interface 22 for receiving location information. Tasks of this component are to know where the location of the current user is, and then to send this information to the server 3. In addition, the CWC will receive data from the proximity event server 3 and displays it for the user on a display device 27a.

The GPS client wireless component 2 operates under the control of the respective session manager 21. The session manager 21 is responsible for the interaction between the subcomponents of the CWC. It prepares the incoming data, such as location and data to send them either further to the proximity server 3 over the WAN interface 23 or displays them over the GUI 24 on a screen 27a.

The GPS interface 22 is implemented as a miniaturized GPS receiver that measures the time a radio signal needs from a GPS satellite in the GPS system 1 until it arrives at the GPS antenna 25. Knowing the speed of the radio signal (approximately the speed of light), and when each signal is transmitted, the distance to each of the satellite can be determined. The final solution of the equations produces an exact position of the antenna 25 (latitude, longitude). The GPS receiver interface 22 determines a current location of the GPS client wireless component 2 and supplies the current location to the session manager 21.

The WAN interface 23 supports a wireless connection to the Internet. With this interface the GPS client wireless component 2 can always be connected to the proximity event server 3. The graphic user interface 24 (GUI) is implemented in GPS client wireless component 2 for an easy-way to configure and to administrate the GPS client wireless component 2. A GPS antenna 25 connects to the GPS interface 22 to receive GPS data from the GPS satellite system.

The WAN transceiver antenna 26 is for the wireless connection to the Internet. It is connected to the WAN interface 23 of the GPS client wireless component 2. The output device 27 may be implemented as a display of a wireless device end the input device 27b as a touch screen. The touch screen is used for manual user inputs and configuration. The display is for output of messages.

The proximity event server 3 identifies people who are close to a location that contains an event or events that might be interesting or important to those people. It then sends them an alert or notification. The session manager 31 gets the location information of users over the WAN interface 32. It stores this information in a location database 35 and notifies the matcher 33 of the new location of a user by sending the user id to the matcher. The WAN interface 32 supports the connection to the Internet for the communication/interaction between the server 3 and user clients 2. When the matcher 33 is notified by the session manager 31 of the new location of a user, it measures the distance between the user's new location and all event locations in the event database 39 by requesting them from the event manager 34. A weighted event score is also computed for the user; the weighted event score is based on the scores of the events and their corresponding weights as defined by the users profile 37. If the measured distance is less then an event distance threshold value and the weighted event score exceeds a user-defined event score threshold value stored in the users profile 37, the matcher 33 will notify the notification unit 38.

When the matcher 33 is notified by the event manager 34 of a new event, it measures the distance between all users' locations and the new event's location. As in the previous case, a weighted event score is also computed for the users, based on the score of the event and the corresponding weight assigned by each users profile 37. If the measured distance is less then an event distance threshold value and the weighted event score exceeds a user-defined event score threshold value stored in the users profile 37, the matcher 33 will notify the notification unit 38.

Examples of events that a typical user might be interested in (as defined by their profile) include reports about earthquakes, chemical spills and other accidents, and other news. The event distance threshold value and the event score threshold value are configured for and by each user in their profile, allowing them to control the amount of event information delivered to them by the system. A trivial modification of this scheme is to associate the event distance threshold value with an event, not with a user-event combination, and using the same event-specific value for every user.

The event manager 34 manages the incoming events from an event stream and stores them to the event database 39. It also assigns an event score to each event; the score indicates the relative importance of the event and ranges in value from zero to one. Incoming events could be new, and thus do not exist in the database 39 yet, or are already present, and need to be updated (events which change dynamically). However, if a new event is coming in, the event manager 34 informs the matcher 33 of the new event.

The location DB 35 stores a users locations for measuring the distance between user and events location. The user location record could be as follows: (user id, location in latitude/longitude). The Status DB 36 contains status information for all users, if a specific event has already sent to the user or not. The notification component 38 needs this information for not sending the same event to the same user several times (event flooding). The status record could be as follows: (user id, event id, send status).

The profile DB 37 contains information for which events a user is interested in. Users are able to subscribe to specific event types and indicate their preferred event distance threshold value and event score threshold value. The matcher 33 needs this information to decide whether to inform the user of new incoming events or not. The profile record could be as follows: (user id, event type, event distance threshold, event score threshold, event score weight). The event score weight and event score threshold range in value from zero to one.

The notification unit 38 is triggered by the matcher 33. Before it sends a notification to a user, e.g. as e-mail, SMS message, XML document, it makes sure that this event has not already been sent to the user. To achieve this, the notification unit 38 requests the user status from the status DB 36 for a specific user and event.

The event DB 35 contains event information of specific events. These records are updated dynamically by receiving events from an event stream. A record in this table will be deleted when its lifetime has expired. The event database 35 is managed by the event manager 34. An event might be represented as an object with attributes: Event Object:(event id, event type, event description, event location, event score, lifetime). The event objects might be described for instance in XML or as a Java object. Distance can be at a specific location and up to a certain distance from that specific location to provide a geo-spatial location of interest (e.g. a 2-km range from a certain location). Event score indicates the relative importance of the event and is assigned by the event manager 34.

Methods of activating a subscribed event by distance can include several methods of geo-spatial distance computation. These include computations of distance in kilometers between any two locations on the planet by giving their latitude and longitude as: Lat1=Latitude of first position (degrees); Lat2=Latitude of second position (degrees); Long1=Longitude of first position (degrees); and Long2=Longitude of second position (degrees) wherein: Distance (kms)=1.852*60*Arc Cos(SIN(Lat1)*SIN(Lat2)+COS(Lat1)Lat2)*COS(Long2−Long1))). Other forms of computing distance include well known software code that computes the distance between two latitude and longitudinal positions using a great circle distance.

A weighted event score (WES) is computed for a user-event combination as WES=ew*es; where ew is the user-defined weight associated with events of that type and es is the corresponding event score assigned by the event manager 34. The weights are retrieved from the user's profile 37 and range from zero to one. Since the event score es ranges from zero to one, the value of the weighted event score WES ranges also ranges from zero to one.

Figure 2:
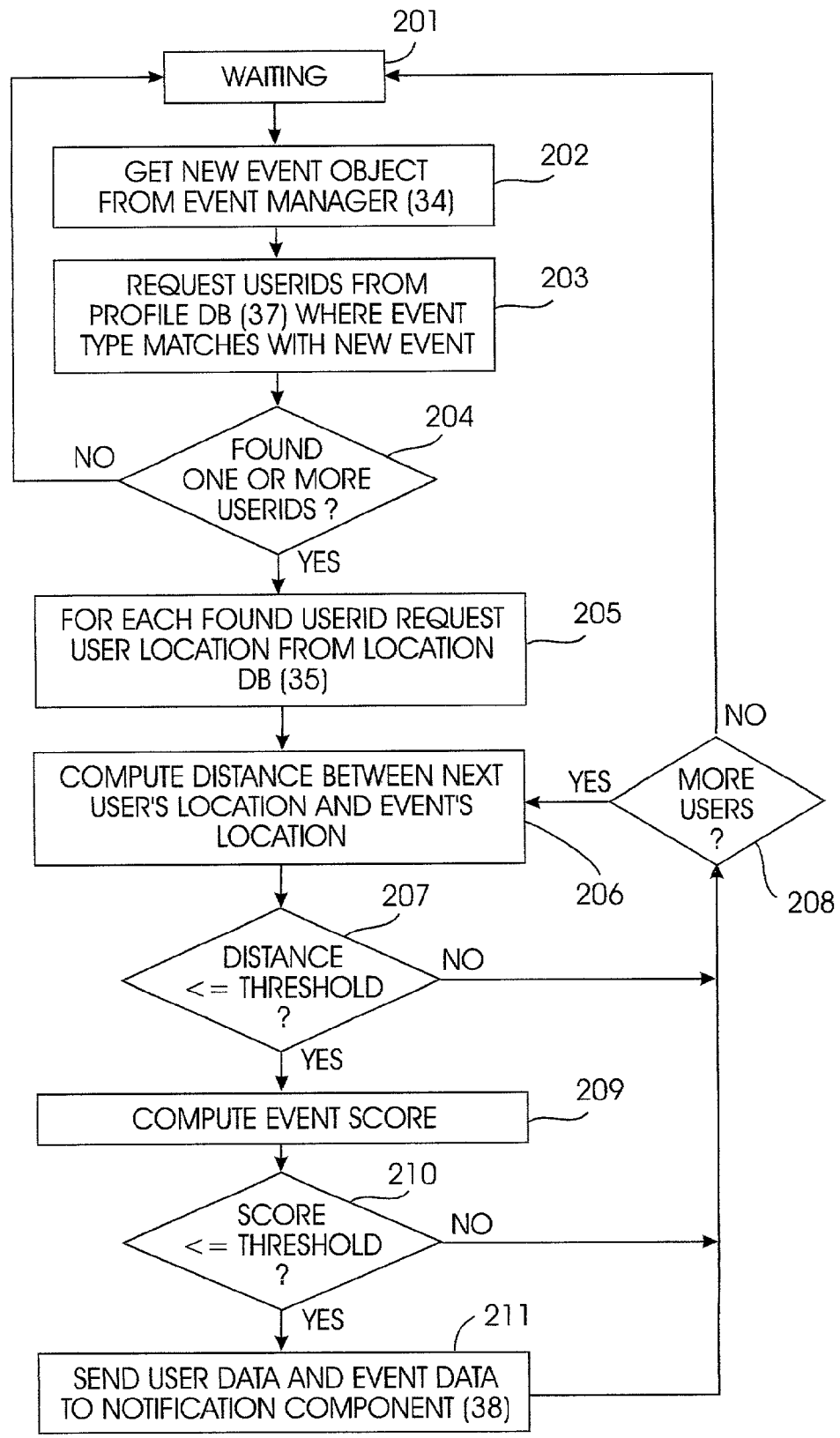
FIG. 2 is a flowchart diagram showing how the matcher is triggered by an event manager according to the invention.

Referring now to FIG. 2, a flowchart diagram shows how the matcher 33 is triggered by the event manager 34. Specifically, at step 201, the system 10 waits until prompted. At step 202, the invention obtains a new event object from the event manager 34. At step 203, a request userids from profile DB 37 is obtained where an event type matches a new event. At step 204, the invention determines whether any additional userids were found. If so, proceed to step 205 wherein for each found userid, request user location from the location DB 35. If no at step 204, then the process begins again by going back to step 201.

Next, at step 206, compute the distance between the user's location and the event's location using geo-spatial distance computations as discussed above. At step 207, if the distance is less than a user-defined event distance threshold, proceed to step 209 to compute the aggregate event score for the user. At step 210, determine whether the aggregate event score exceeds the event score threshold value for the user. If yes, proceed to step 211 and deliver the user data and event data to the notification component 38.

At step 207 and at step 210, if the decision was no, proceed to step 208 to determine if there are more users. If not, start over at step 201 or proceed to step 206 again until there are no more users.

Figure 3:
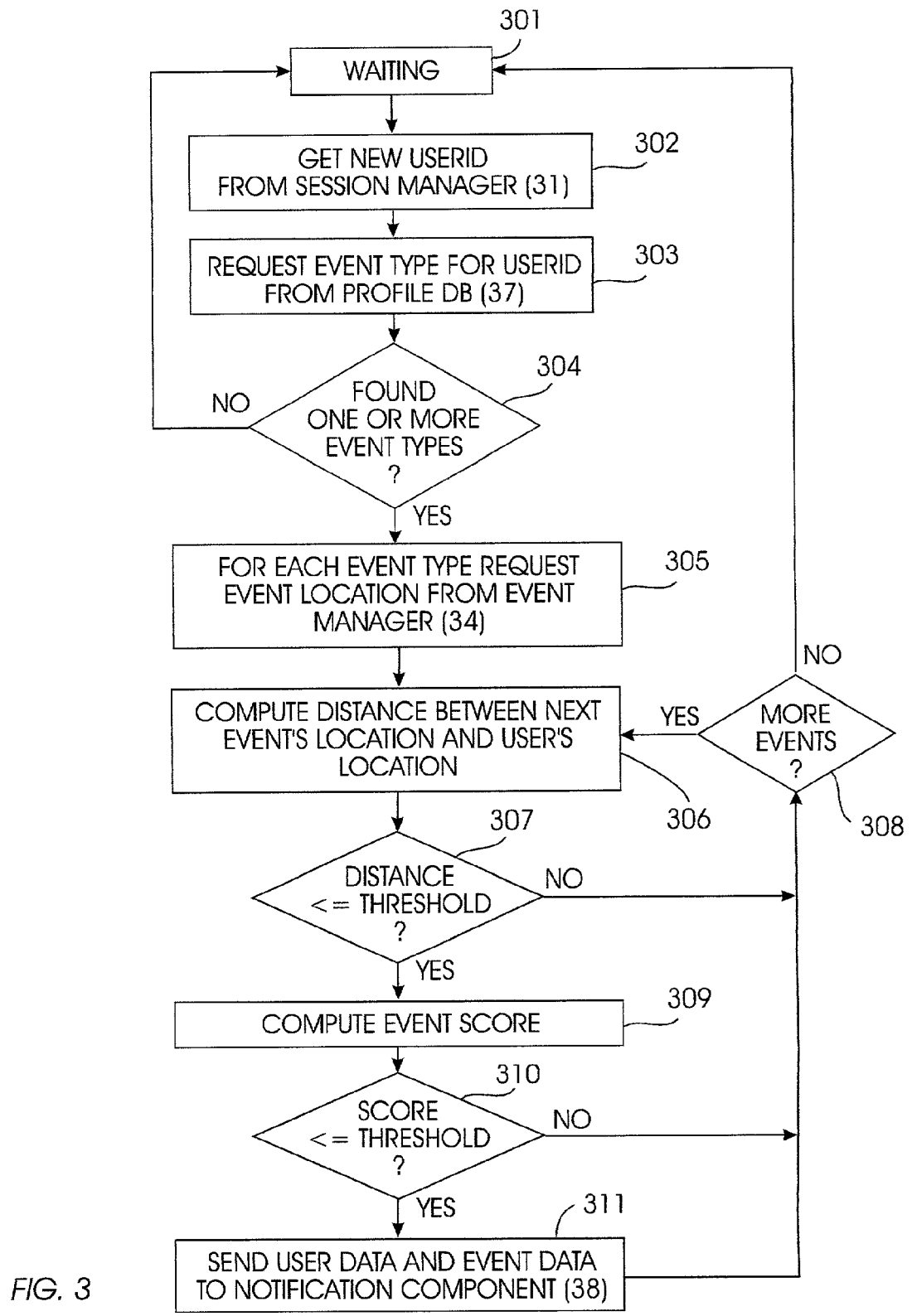
FIG. 3 is a flowchart diagram showing how a matcher is triggered by a session manager according to the invention.

Referring now to FIG. 3, a flowchart diagram shows how the matcher 33 is triggered by the invention's session manager 31. Specifically, at step 301, the system 10 waits until prompted. At step 302, the invention gets a new userid from the session manager 31. At step 303, the invention requests userids from profile DB 37. At step 304, the invention determines if there are any additional event types found. If yes, the invention proceeds to step 305 wherein for each found event type, request event location from the event manager 34. If no, then the invention goes back to step 301.

Next, at step 306, compute the distance between the events location and the users location using geo-spatial distance computations as discussed above. At step 307, if the distance is less than a predetermined threshold distance, proceed to step 309 to compute the aggregate event score for the event. At step 310, determine whether the aggregate event score exceeds the event score threshold value for the user. If yes, proceed to step 311 and deliver the user data and event data to the notification component 38.

At step 307 and at step 310, if the decision was no, proceed to step 308 to determine if there are more users. If not, start over at step 301 and proceed to step 306 again until there are no more events.

Figure 4:
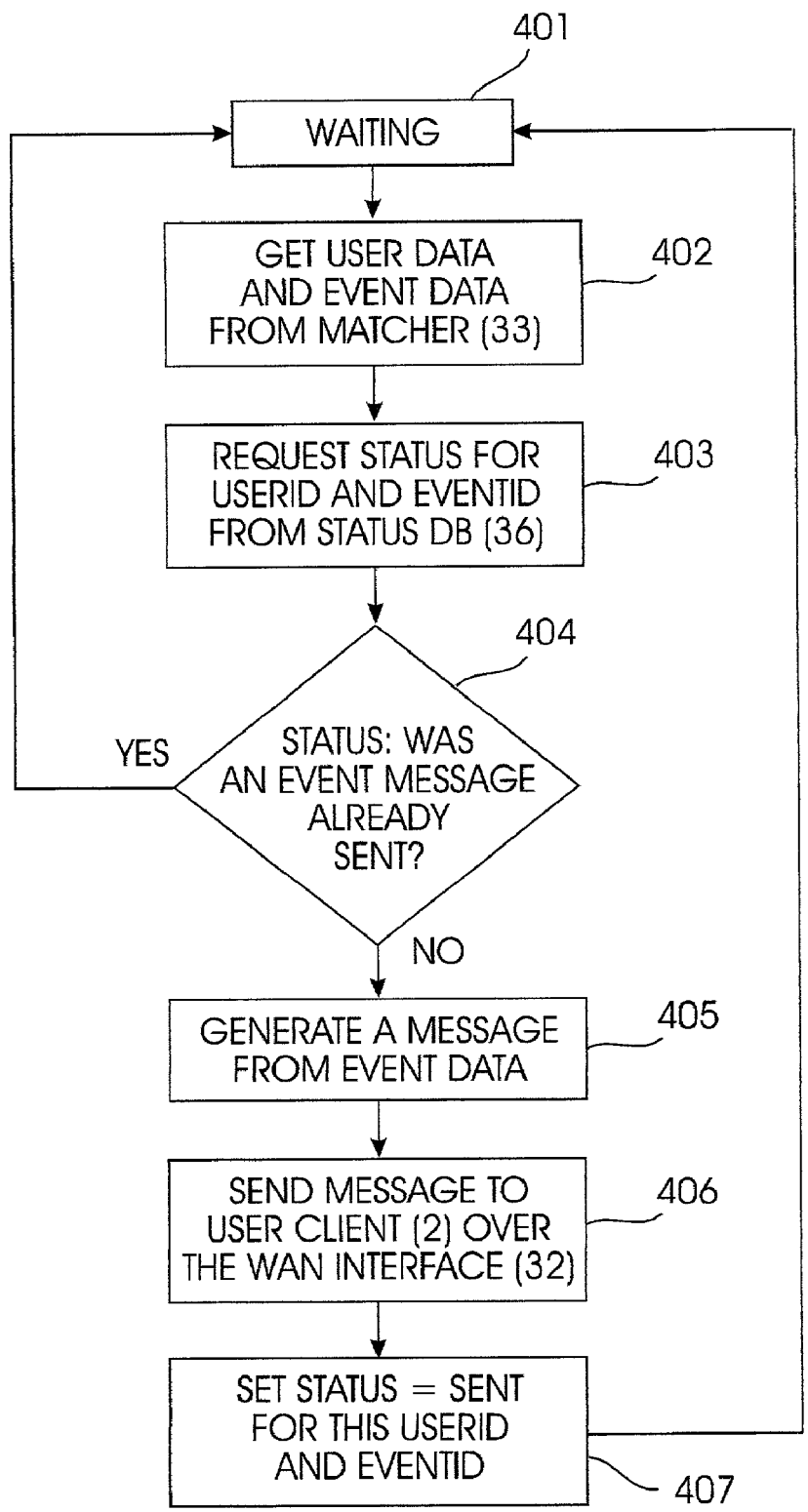
FIG. 4 is a flowchart diagram showing how a notification component is triggered by a matcher according to the invention.
Figure 5:
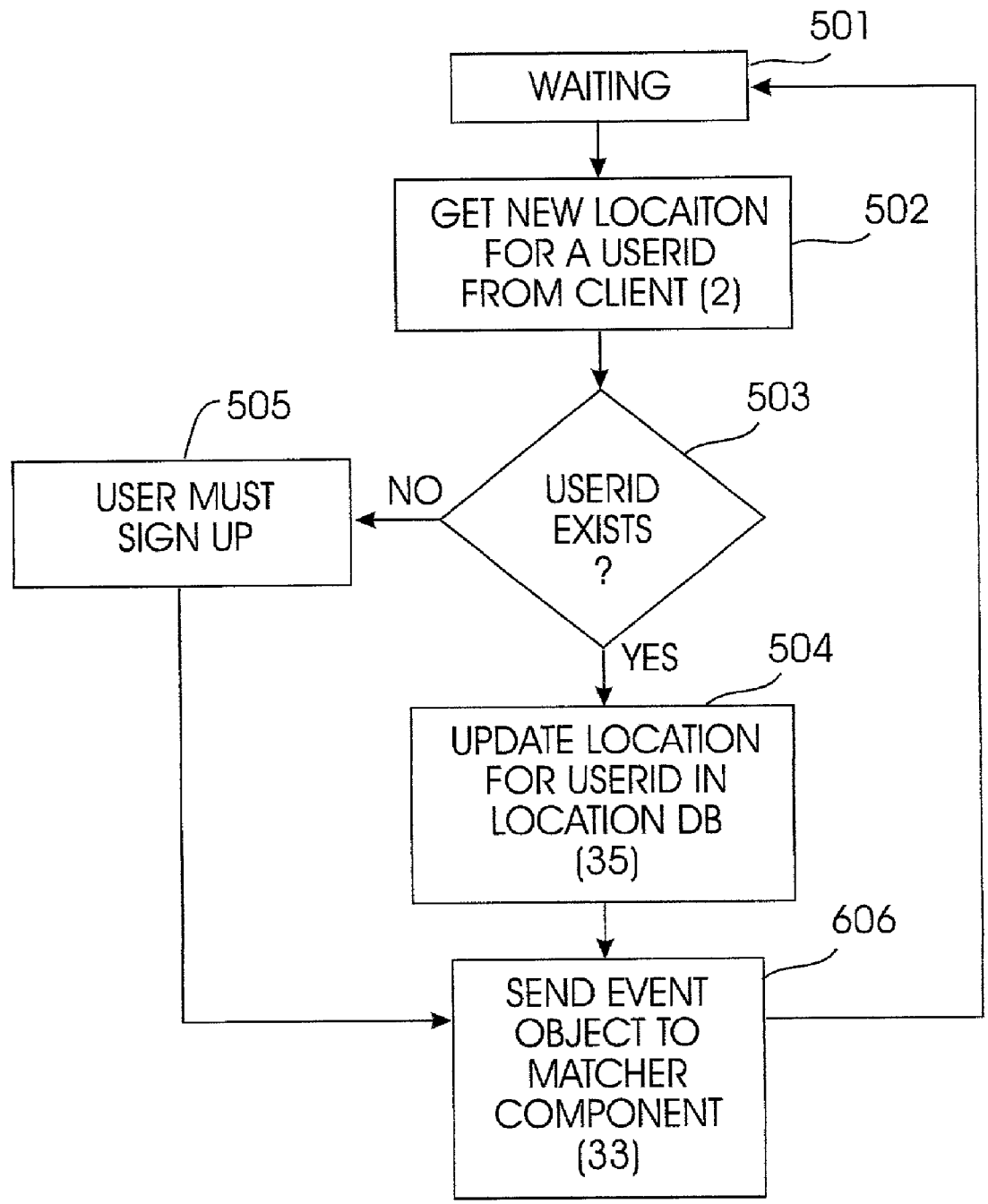
FIG. 5 is a flowchart diagram showing how the session manager operates according to the invention.

Referring to FIG. 4, a flowchart diagram shows how the invention's notification component 38 is triggered by the matcher 33. Specifically, at step 401, the system 10 waits until prompted. At step 402, the invention obtains user data and event data from the matcher 33. At step 403, a request status is made for userids and eventids from status DB 36. At step 404, the invention determines whether an event message was already sent? If no, the invention proceeds to step 405 and generates a message from the event data. If yes, the invention goes back to step 401. At step 406 after step 405, a message is sent to a user over the WAN interface 32. At step 407, set status as being sent for this userid and eventide In FIG. 5, a flowchart diagram shows how the invention's session manager 31 operates. Specifically, at step 501, the system 10 waits until prompted. At step 502, get new location for a userid from the user client wireless component 2. At decision step 503, a determination is made whether a valid userid exists. If no, a nonsubscribing user must sign up in step 505. If yes, proceed to step 504 to update location for userid in the location DB 35. Finally, at step 506, the invention sends userid to the matcher 33.

Figure 6:
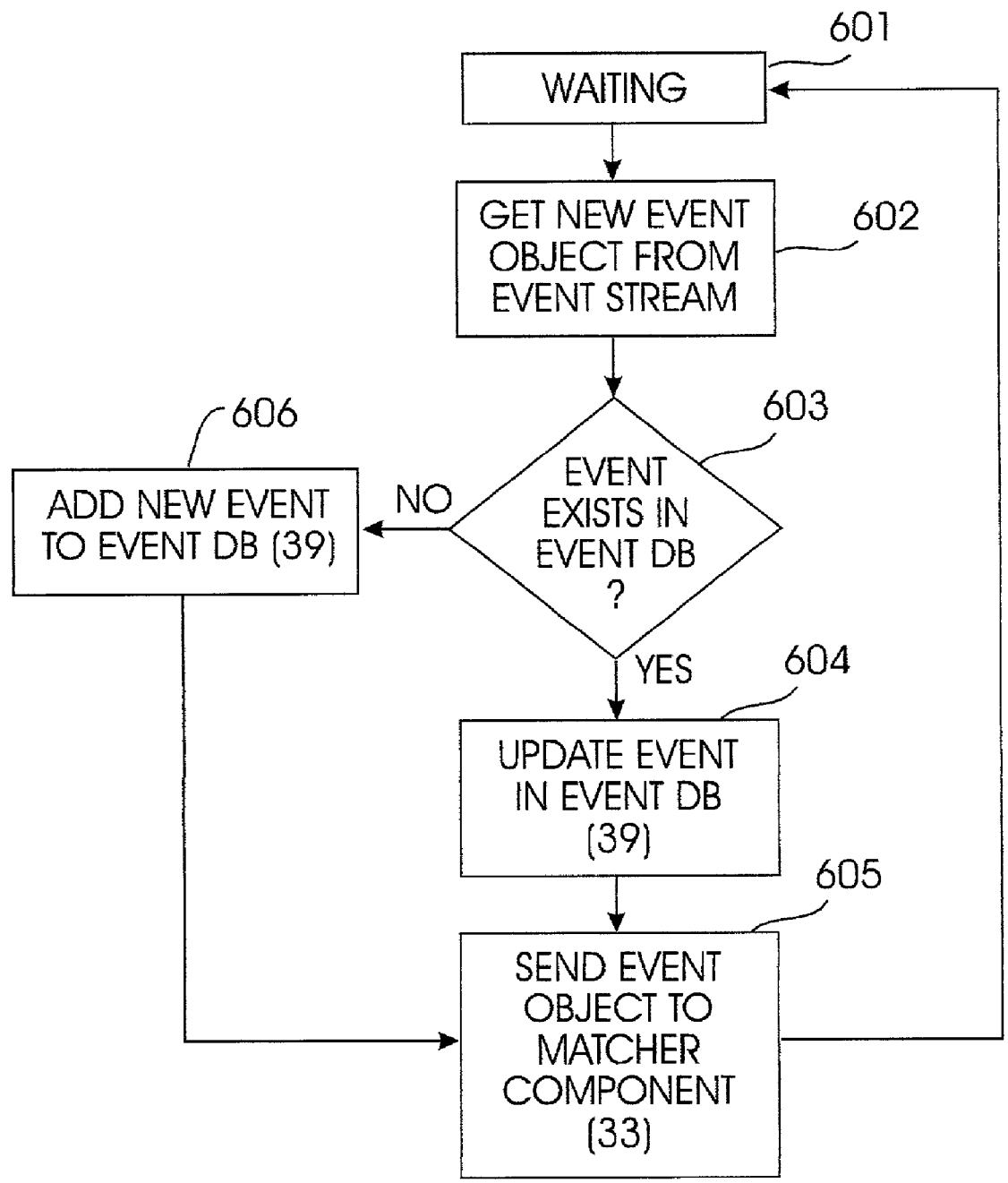
FIG. 6 is a flowchart diagram of an event manager operation according to the invention.

In FIG. 6, a flowchart diagram shows how the invention's event manager 34 operates. Specifically, at step 601, the system 10 waits until prompted. Next, at step 602, the invention gets a new event object from the "Event Stream." At step 603, does the Event exists in the event DB? If yes, the invention goes to step 604 and update event in event DB 39. If no, the invention goes to step 606 and adds new event to event DB 39 and the invention proceeds to step 605 which sends event object to the matcher 33. After step 604, the invention goes to step 605 and then the invention goes back to step 601.

A preferred use of the invention is to provide geo-spatial event data, some examples of which include: crime reports (e.g. robbery or terrorism); traffic safety reports (accidents, visibility, slippery road); and environmental hazard reports (nuclear radiation, chemical spills, weather phenomena, natural disasters, fire).

While the overall methodology of the invention is described above, the invention can be embodied in any number of different types of hardware systems and executed in any number of different ways, as would be known by one ordinarily skilled in the art. In particular, various applications of the invention include accident alerts, news alerts, alerts for tourists who are near interesting attractions, or people who may be close to a book store where their favorite author is having a book signing. In the future, automobiles that have on-board computers and GPS receivers can provide an integrated traffic safety system that alerts the driver of any nearby accidents or other noteworthy events.

In summary, the invention provides a system and method for communicating data of significance to a specific location only to those individuals that are at or near that location using wireless based components. In particular, where safety is of great significance and being the subscribed to information by a user, such information is tailored to that individual at that location by selectively filtering what is communicated and what is not.

While the invention has been described in terms of preferred embodiments, those skilled in the art will recognize that the invention can be practiced with modification within the spirit and scope of the appended claims.

What is claimed is:

1. A method of activating geo-spatial dependent data using a wireless component having a global positioning satellite (GPS) interface, said method comprising:
   identifying a current geo-spatial location of said wireless component;
   evaluating whether to send dynamic event data from a server to said wireless component based on said geo-spatial location; and
   controlling said dynamic event data delivered to said wireless component using a user-defined profile.

2. The method in claim 1, wherein said event data comprises safety-related events.

3. The meted in claim 2, wherein said evaluating includes calculating a weighted event score (WES) associated with said geo-spatial location defined as a product of ew*es, wherein ew is a weight associated with a safety-related event and es is a corresponding event score; and outputting said WES for display on said wireless component.

4. The method in claim 1, further comprising maintaining and updating said event managed data and said event subscribed data including:
   maintaining and updating a status record represented by a user identification, event identification, and send status;
   said event data being represented by an object with attributes of said event identification, event type, event description, event location, event score, and a lifetime;
   user location data being represented by said user identification, a location in latitude/longitude; and
   profile record data being represented by said user identification, said event type, a distance threshold, a score weight and a score threshold.

5. The method in claim 4, wherein said notifying said wireless component of said event subscribed data comprises:
   obtaining user data and said event data;
   requesting status of said user identification and said event identification;
   determining whether an event message was previously sent;
   generating a message from said event data;
   sending information to said server; and
   recording status as to sending said information for said user identification and said event identification.

6. The method in claim 5, wherein said maintaining and said updating of said event managed data and said event subscribed data includes:
   obtaining a new event object;
   requesting said user identification from a profile database wherein said event type matches said new event;
   determining whether there are any more said user identification;
   requesting for each found said user identification, a user location;
   computing a distance of said user location and said event location using geo-spatial distance computations;
   comparing said distance with an event distance threshold;
   computing an event score for said user; and
   determining whether said event score exceeds said event score threshold,
   wherein said notifying of said wireless component of said event subscribed data occurs when said event threshold distance and said score Threshold are within predetermined values and there are no more said users.

7. The method in claim 5, wherein said maintaining and said updating of said event managed data and said event subscribed data includes:
   obtaining a new user identification;
   requesting said event type for said user identification;
   determining whether there &e any additional event types;
   requesting for each said event type, an event location;
   computing a distance of said user location and said event location using geo-spatial distance computations;
   comparing said distance with an event distance threshold;
   computing an event score for said user; and
   determining whether said event score exceeds said event score threshold,
   wherein said notifying of said wireless component of said event subscribed data occurs when said event threshold distance and said score threshold are within predetermined values and there are no more said events.

8. The method in claim 1, wherein said evaluating further comprises determining if a measured distance between an event location and said current geo-spatial location is less than an event distance threshold value.

9. The method in claim 8, wherein said event distance threshold value comprises a user-established value.

10. The method in claim 1, wherein said evaluating further comprises determining if a weighted event score of an event exceeds an event score threshold value.

11. The method in claim 10, wherein said event score threshold value comprises a user-established value.

12. The method in claim 1, wherein said evaluating further comprises using user-specified profiles to determine whether to send said dynamic event data.

13. A program storage device readable by machine, tangibly embodying a program of instructions executable by said machine to perform a method for activating geo-spatial dependent data using a wireless component having a global positioning satellite (GPS) interface, said method comprising:
   identifying a current geo-spatial location of said wireless component;
   evaluating whether to send dynamic event data from a server to said wireless component based on said geo-spatial location; and
   controlling said dynamic event data delivered to said wireless component using a user-defined profile.

14. The program storage device in claim 13, wherein said further comprises maintaining and updating said event managed data and said event subscribed data including:
   maintaining and updating a status record represented by a user identification, event identification, and send status;

said event data being represented by an object with attributes of said event identification, event type, event description, event location, event score, and a lifetime;

user location data being represented by said user identification, a location in latitude/longitude; and profile record data being represented by said user identification, said event type, a distance threshold, a scare weight, and a score threshold.

15. The program storage device in claim 14, wherein said notifying said wireless component of said event subscribed data comprises:

obtaining user data and said event data;

requesting status of said user identification and said event identification;

determining whether an event message was previously sent;

generating a message from said event data;

sending information to said server; and recording status as to sending said information for said user identification and said event identification.

16. The program storage device in claim 15, wherein said maintaining and said updating of said event managed data and said event subscribed data includes:

obtaining a new event object;

requesting said user identification from a profile database wherein said event type matches said new event;

determining whether there are any more said user identification;

requesting for each found said user identification, a user location;

computing a distance of said user location and said event location using geo-spatial distance computations;

comparing said distance with an event distance threshold;

computing an event score for said user; and determining whether said event score exceeds said event score threshold, wherein said notifying of said wireless component of said event subscribed data occurs when said event threshold distance and said score threshold are within predetermined values and there are no more said users.

17. The program storage device in claim 15, wherein said maintaining and said updating of said event managed data and said event subscribed data includes:

obtaining a new user identification;

requesting said event type for said user identification;

determining whether there are any additional event types;

requesting for each said event type, an event location;

computing a distance of said user location and said event location using geo-spatial distance computations;

comparing said distance with an event distance threshold;

computing an event score for said user; and determining whether said event score exceeds said event score threshold, wherein said notifying of said wireless component of said event subscribed data occurs when said event threshold distance and said score threshold are within predetermined values and there are no more said events.

18. The program storage device in claim 13, wherein said event data comprises safety-related events.

19. The program storage device in claim 18, wherein said evaluating includes calculating a weighted event score (WES) associated with said geo-spatial location defined as a product of ew*es, wherein ew is a weight associated with a safety-related event and es is a corresponding event score; and outputting said WES for display on said wireless component.

20. A system for activating geo-spatial dependent event data, the system comprising:

a wireless component configured for use with global positioning satellites; and a server adapted to communicate with said wireless component, wherein said server includes an event database, wherein said wireless component provides said server with a current geo-spatial location of said wireless component based on said global positioning satellites;

wherein said server evaluates whether to provide said geo-spatial dependent dynamic event data from said event database to said wireless component based on said current geo-spatial location; and wherein said server controls said dynamic event data delivered to said wireless component using a user-defined profile.

21. The system in claim 20, wherein said server further comprises:

a server session manager operatively connected a location database and a matcher component;

a notification unit operatively connected to said matcher component operatively connected to an event manager that receives external event data;

a profile database operatively connected to said matcher component; and a status database operatively connected to said notification unit.

22. The system in claim 21, wherein said system comprises a personal safety advisor system wherein said session manager comprises a profile manager, said event manager comprises a user session manager and a event manager, and said profile database comprises a safety profile database.

23. The system in claim 21, wherein said server and said wireless component each include a wide area network (WAN) interface, and wherein said WAN interface in said server is operatively connected to said server session manager and said notification unit.

24. The system in claim 20, wherein said wireless component includes a graphical user interface for output display of said geo-spatial dependent data.

25. The system in claim 23, wherein said wireless component includes a session manager operatively connected to said WAN interface and a GPS interface.

26. The system in claim 24, wherein said wireless component further includes a session manager that is operatively connected to graphical user interface.

27. A wireless component comprising:

an receiver for receiving signals from global positioning satellites; and an interface adapted to communicate with a server, wherein said server includes an event database and a user profile, wherein said wireless component provides said server with a current geo-spatial location of said wireless component based on said global positioning satellites;

wherein said server evaluates whether to provide geo-spatial dependent dynamic event data from said event database to said wireless component based on said current geo-spatial location; and wherein said server controls said dynamic event data delivered to said wireless component using a user-defined profile.

28. The wireless component in claim 27, further comprising a personal safety advisor system.

29. The wireless component in claim 27, further comprising a graphical user interface for output display of said geo-spatial dependent data.

30. The wireless component in claim 27, further comprising a session manager operatively connected to said receiver, said interface, and a graphical user interface.

* * * * *